United States Patent [19]
Kim

[11] Patent Number: 5,825,970
[45] Date of Patent: Oct. 20, 1998

[54] QUANTIZATION NUMBER SELECTING APPARATUS FOR DVCR AND METHOD THEREFOR

[75] Inventor: Seung Il Kim, Seoul, Rep. of Korea

[73] Assignee: LG Electronics Inc., Seoul, Rep. of Korea

[21] Appl. No.: 568,279

[22] Filed: Dec. 6, 1995

[30] Foreign Application Priority Data

Dec. 20, 1994 [KR] Rep. of Korea .................. 35304/1994
Jan. 12, 1995 [KR] Rep. of Korea ...................... 441/1995

[51] Int. Cl.⁶ .............................. H04N 5/917; H04N 7/26
[52] U.S. Cl. ............................................ 386/109; 386/112
[58] Field of Search ..................................... 348/405, 406, 348/384, 387; 386/109, 111, 27, 33, 112; H04N 5/917, 7/26

[56] References Cited

U.S. PATENT DOCUMENTS 5,150,208  9/1992  Otaka et al. ............................. 348/405
5,528,298  6/1996  Enari et al. ............................. 348/405
5,530,478  6/1996  Sasaki et al. ........................... 348/405
5,537,440  7/1996  Eyuboglu et al. ...................... 375/245

*Primary Examiner*—Robert Chevalier
*Attorney, Agent, or Firm*—John P. White

[57] ABSTRACT

In a quantization number selecting apparatus and method for a DVCR which can simplify the hardware configuration of a quantizer and can efficiently assign a proper quantization number minimizing quantization errors, the apparatus includes a plurality of quantizers serially connected and having each quantization number, for receiving a video segment composed of a plurality of macro-blocks and sequentially performing quantization according to each area number and class number, a plurality of bit-rate calculators for calculating each bit rate by the respective outputs of the plurality of quantizers, a plurality of quantization error summing portions serially connected for calculating quantization errors by the outputs of the plurality of quantizers and sequentially summing the same, and a bit estimator for selecting a quantization number by which each macro-block can be compressed into an adaptive length by the respective outputs of the bit-rate calculators and quantization error summing portions. Also, the method includes the steps of (1) sequentially quantizing a plurality of macro-blocks constituting a video segment, (2) calculating and sequentially summing bit-rates and quantization errors depending on the plurality of quantized macro-blocks, and (3) searching a macro-block having the minimum quantization error based on the calculated and summed bit-rates and quantization errors and allotting a quantization number having an adaptive bit-rate.

6 Claims, 17 Drawing Sheets

FIG.1
prior art

|  | LEFT | | | x → | | | RIGHT | |  |
|---|---|---|---|---|---|---|---|---|---|
| TOP | 0,0 | 1,0 | 2,0 | 3,0 | 4,0 | 5,0 | 6,0 | 7,0 | ← Field 2 |
|  | 0,1 | 1,1 | 2,1 | 3,1 | 4,1 | 5,1 | 6,1 | 7,1 | ← Field 1 |
|  | 0,2 | 1,2 | 2,2 | 3,2 | 4,2 | 5,2 | 6,2 | 7,2 | ← Field 2 |
|  | 0,3 | 1,3 | 2,3 | 3,3 | 4,3 | 5,3 | 6,3 | 7,3 | ← Field 1 |
| y ↓ | 0,4 | 1,4 | 2,4 | 3,4 | 4,4 | 5,4 | 6,4 | 7,4 | ← Field 2 |
|  | 0,5 | 1,5 | 2,5 | 3,5 | 4,5 | 5,5 | 6,5 | 7,5 | ← Field 1 |
|  | 0,6 | 1,6 | 2,6 | 3,6 | 4,6 | 5,6 | 6,6 | 7,6 | ← Field 2 |
| BOTTOM | 0,7 | 1,7 | 2,7 | 3,7 | 4,7 | 5,7 | 6,7 | 7,7 | ← Field 1 |

Super Block
$S_{i,0}$, $S_{i,2}$ (i=0,...,9)

| 0 | 11 | 12 | 23 | 24 |
|---|----|----|----|----|
| 1 | 10 | 13 | 22 | 25 |
| 2 | 9  | 14 | 21 | 26 |
| 3 | 8  | 15 | 20 |    |
| 4 | 7  | 16 | 19 |    |
| 5 | 6  | 17 | 18 |    |

Super Block
$S_{i,1}$, $S_{i,3}$ (i=0,...,9)

|   | 8 | 9  | 20 | 21 |
|---|---|----|----|----|
|   | 7 | 10 | 19 | 22 |
|   | 6 | 11 | 18 | 23 |
| 0 | 5 | 12 | 17 | 24 |
| 1 | 4 | 13 | 16 | 25 |
| 2 | 3 | 14 | 15 | 26 |

Super Block
$S_{i,4}$ (i=0,...,9)

| 0 | 11 | 12 | 23 | 24 |
|---|----|----|----|----|
| 1 | 10 | 13 | 22 |    |
| 2 | 9  | 14 | 21 | 25 |
| 3 | 8  | 15 | 20 |    |
| 4 | 7  | 16 | 19 | 26 |
| 5 | 6  | 17 | 18 |    |

FIG. 5B
prior art

Super Block
$S_{ij}$ (i=0,...,11, j=0,...,4)

| 0 | 5 | 6 | 11 | 12 | 17 | 18 | 23 | 24 |
|---|---|---|----|----|----|----|----|----|
| 1 | 4 | 7 | 10 | 13 | 16 | 19 | 22 | 25 |
| 2 | 3 | 8 | 9  | 14 | 15 | 20 | 21 | 26 |

FIG. 6A
prior art

| | LEFT | | 720 pixels | | RIGHT |
|---|---|---|---|---|---|
| TOP | $S_{0,0}$ | $S_{0,1}$ | $S_{0,2}$ | $S_{0,3}$ | $S_{0,4}$ |
| | $S_{1,0}$ | $S_{1,1}$ | $S_{1,2}$ | $S_{1,3}$ | $S_{1,4}$ |
| | $S_{2,0}$ | $S_{2,1}$ | $S_{2,2}$ | $S_{2,3}$ | $S_{2,4}$ |
| | $S_{3,0}$ | $S_{3,1}$ | $S_{3,2}$ | $S_{3,3}$ | $S_{3,4}$ |
| | $S_{4,0}$ | $S_{4,1}$ | $S_{4,2}$ | $S_{4,3}$ | $S_{4,4}$ |
| 480 lines | $S_{5,0}$ | $S_{5,1}$ | $S_{5,2}$ | $S_{5,3}$ | $S_{5,4}$ |
| | $S_{6,0}$ | $S_{6,1}$ | $S_{6,2}$ | $S_{6,3}$ | $S_{6,4}$ |
| | $S_{7,0}$ | $S_{7,1}$ | $S_{7,2}$ | $S_{7,3}$ | $S_{7,4}$ |
| | $S_{8,0}$ | $S_{8,1}$ | $S_{8,2}$ | $S_{8,3}$ | $S_{8,4}$ |
| BOTTOM | $S_{9,0}$ | $S_{9,1}$ | $S_{9,2}$ | $S_{9,3}$ | $S_{9,4}$ |

FIG. 6B
prior art

| | LEFT | | 720 pixels | | RIGHT |
|---|---|---|---|---|---|
| TOP | $S_{0,0}$ | $S_{0,1}$ | $S_{0,2}$ | $S_{0,3}$ | $S_{0,4}$ |
| | $S_{1,0}$ | $S_{1,1}$ | $S_{1,2}$ | $S_{1,3}$ | $S_{1,4}$ |
| | $S_{2,0}$ | $S_{2,1}$ | $S_{2,2}$ | $S_{2,3}$ | $S_{2,4}$ |
| | $S_{3,0}$ | $S_{3,1}$ | $S_{3,2}$ | $S_{3,3}$ | $S_{3,4}$ |
| | $S_{4,0}$ | $S_{4,1}$ | $S_{4,2}$ | $S_{4,3}$ | $S_{4,4}$ |
| 576 lines | $S_{5,0}$ | $S_{5,1}$ | $S_{5,2}$ | $S_{5,3}$ | $S_{5,4}$ |
| | $S_{6,0}$ | $S_{6,1}$ | $S_{6,2}$ | $S_{6,3}$ | $S_{6,4}$ |
| | $S_{7,0}$ | $S_{7,1}$ | $S_{7,2}$ | $S_{7,3}$ | $S_{7,4}$ |
| | $S_{8,0}$ | $S_{8,1}$ | $S_{8,2}$ | $S_{8,3}$ | $S_{8,4}$ |
| | $S_{9,0}$ | $S_{9,1}$ | $S_{9,2}$ | $S_{9,3}$ | $S_{9,4}$ |
| | $S_{10,0}$ | $S_{10,1}$ | $S_{10,2}$ | $S_{10,3}$ | $S_{10,4}$ |
| BOTTOM | $S_{11,0}$ | $S_{11,1}$ | $S_{11,2}$ | $S_{11,3}$ | $S_{11,4}$ |

FIG. 8A
prior art
(8x8) DCT

| | 0 | 1 | 2 | 3 | 4 | 5 | 6 | 7 | h |
|---|---|---|---|---|---|---|---|---|---|
| 0 | 1 | 2 | 6 | 7 | 15 | 16 | 28 | 29 | |
| 1 | 3 | 5 | 8 | 14 | 17 | 27 | 30 | 43 | |
| 2 | 4 | 9 | 13 | 18 | 26 | 31 | 42 | 44 | |
| 3 | 10 | 12 | 19 | 25 | 32 | 41 | 45 | 54 | |
| 4 | 11 | 20 | 24 | 33 | 40 | 46 | 53 | 55 | |
| 5 | 21 | 23 | 34 | 39 | 47 | 52 | 56 | 61 | |
| 6 | 22 | 35 | 38 | 48 | 51 | 57 | 60 | 62 | |
| 7 | 36 | 37 | 49 | 50 | 58 | 59 | 63 | 64 | |
| v | | | | | | | | | |

FIG. 8B
prior art
(2x4x8) DCT (sum)

| | 0 | 1 | 2 | 3 | 4 | 5 | 6 | 7 | h |
|---|---|---|---|---|---|---|---|---|---|
| 0 | 1 | 3 | 7 | 19 | 21 | 35 | 37 | 51 | |
| 1 | 5 | 9 | 17 | 23 | 33 | 39 | 49 | 53 | |
| 2 | 11 | 15 | 25 | 31 | 41 | 47 | 55 | 61 | |
| 3 | 13 | 27 | 29 | 43 | 45 | 57 | 59 | 63 | |
| v | | | | | | | | | |

(difference)

| | 0 | 1 | 2 | 3 | 4 | 5 | 6 | 7 | h |
|---|---|---|---|---|---|---|---|---|---|
| 4 | 2 | 4 | 8 | 20 | 22 | 36 | 38 | 52 | |
| 5 | 6 | 10 | 18 | 24 | 34 | 40 | 50 | 54 | |
| 6 | 12 | 16 | 26 | 32 | 42 | 48 | 56 | 62 | |
| 7 | 14 | 28 | 30 | 44 | 46 | 58 | 60 | 64 | |
| v | | | | | | | | | |

FIG. 9A
prior art
(8x8) DCT

| | 0 | 1 | 2 | 3 | 4 | 5 | 6 | 7 | h |
|---|---|---|---|---|---|---|---|---|---|
| 0 | DC | 0 | 0 | 1 | 1 | 1 | 2 | 2 | |
| 1 | 0 | 0 | 1 | 1 | 1 | 2 | 2 | 2 | |
| 2 | 0 | 1 | 1 | 1 | 2 | 2 | 2 | 3 | |
| 3 | 1 | 1 | 1 | 2 | 2 | 2 | 3 | 3 | |
| 4 | 1 | 1 | 2 | 2 | 2 | 3 | 3 | 3 | |
| 5 | 1 | 2 | 2 | 2 | 3 | 3 | 3 | 3 | |
| 6 | 2 | 2 | 2 | 3 | 3 | 3 | 3 | 3 | |
| 7 | 2 | 2 | 3 | 3 | 3 | 3 | 3 | 3 | |
| v | | | | | | | | | |

FIG. 9B
prior art
(2x4x8) DCT (sum)

| | 0 | 1 | 2 | 3 | 4 | 5 | 6 | 7 | h |
|---|---|---|---|---|---|---|---|---|---|
| 0 | DC | 0 | 1 | 1 | 1 | 2 | 2 | 3 | |
| 1 | 0 | 1 | 1 | 2 | 2 | 2 | 3 | 3 | |
| 2 | 1 | 1 | 2 | 2 | 2 | 3 | 3 | 3 | |
| 3 | 1 | 2 | 2 | 2 | 3 | 3 | 3 | 3 | |
| v | | | | | | | | | |

(difference)

| | 0 | 1 | 2 | 3 | 4 | 5 | 6 | 7 | h |
|---|---|---|---|---|---|---|---|---|---|
| 4 | 0 | 0 | 1 | 1 | 2 | 2 | 2 | 3 | |
| 5 | 0 | 1 | 1 | 2 | 2 | 2 | 3 | 3 | |
| 6 | 1 | 1 | 2 | 2 | 2 | 3 | 3 | 3 | |
| 7 | 1 | 2 | 2 | 3 | 3 | 3 | 3 | 3 | |
| v | | | | | | | | | |

| | Class No. | | | | Area No. | | | |
|---|---|---|---|---|---|---|---|---|
| | 0 | 1 | 2 | 3 | 0 | 1 | 2 | 3 |
| Quantization number QNO | 15 | | | | 1 | 1 | 1 | 1 |
| | 14 | | | | 1 | 1 | 1 | 1 |
| | 13 | | | | 1 | 1 | 1 | 1 |
| | 12 | 15 | | | 1 | 1 | 1 | 1 |
| | 11 | 14 | | | 1 | 1 | 1 | 1 |
| | 10 | 13 | | 15 | 1 | 1 | 1 | 1 |
| | 9 | 12 | 15 | 14 | 1 | 1 | 1 | 1 |
| | 8 | 11 | 14 | 13 | 1 | 1 | 1 | 2 |
| | 7 | 10 | 13 | 12 | 1 | 1 | 2 | 2 |
| | 6 | 9 | 12 | 11 | 1 | 1 | 2 | 2 |
| | 5 | 8 | 11 | 10 | 1 | 2 | 2 | 4 |
| | 4 | 7 | 10 | 9 | 1 | 2 | 2 | 4 |
| | 3 | 6 | 9 | 8 | 2 | 2 | 4 | 4 |
| | 2 | 5 | 8 | 7 | 2 | 2 | 4 | 4 |
| | 1 | 4 | 7 | 6 | 2 | 4 | 4 | 8 |
| | 0 | 3 | 6 | 5 | 2 | 4 | 4 | 8 |
| | | 2 | 5 | 4 | 4 | 4 | 8 | 8 |
| | | 1 | 4 | 3 | 4 | 4 | 8 | 8 |
| | | 0 | 3 | 2 | 4 | 8 | 8 | 16 |
| | | | 2 | 1 | 4 | 8 | 8 | 16 |
| | | | 1 | 0 | 8 | 8 | 16 | 16 |
| | | | 0 | | 8 | 8 | 16 | 16 |

FIG. 19

| Unit No. | Byte position No. | | | | | | | |
|---|---|---|---|---|---|---|---|---|
| | | 5 | 6 7....19 | 20....33 | 34....47 | 48....61 | 62....71 | 72....81 |
| U(i+2)mod n,2,k | QNO | STA | F(i+2)mod n,2,k,0 | F(i+2)mod n,2,k,1 | F(i+2)mod n,2,k,2 | F(i+2)mod n,2,k,3 | F(i+2)mod n,2,k,4 | F(i+2)mod n,2,k,5 |
| U(i+6)mod n,1,k | QNO | STA | F(i+6)mod n,1,k,0 | F(i+6)mod n,1,k,1 | F(i+6)mod n,1,k,2 | F(i+6)mod n,1,k,3 | F(i+6)mod n,1,k,4 | F(i+6)mod n,1,k,5 |
| U(i+8)mod n,3,k | QNO | STA | F(i+8)mod n,3,k,0 | F(i+8)mod n,3,k,1 | F(i+8)mod n,3,k,2 | F(i+8)mod n,3,k,3 | F(i+8)mod n,3,k,4 | F(i+8)mod n,3,k,5 |
| U i mod n,0,k | QNO | STA | Fi mod n,0,k,0 | Fi mod n,0,k,1 | Fi mod n,0,k,2 | Fi mod n,0,k,3 | Fi mod n,0,k,4 | Fi mod n,0,k,5 |
| U(i+4)mod n,4,k | QNO | STA | F(i+4)mod n,4,k,0 | F(i+4)mod n,4,k,1 | F(i+4)mod n,4,k,2 | F(i+4)mod n,4,k,3 | F(i+4)mod n,4,k,4 | F(i+4)mod n,4,k,5 |

$i=0,...,n-1$, $k=0,...,26$,
$n=10$(525/60 system), $n=12$(625/50 system)

QUANTIZATION NUMBER SELECTING APPARATUS FOR DVCR AND METHOD THEREFOR

BACKGROUND OF THE INVENTION

The present invention relates to a quantization number selecting apparatus for a digital video cassette recorder (DVCR) and a method therefor, and more particularly, to a quantization number selecting apparatus and method for a digital video cassette recorder (DVCR) which can simplify the hardware configuration of a quantizer by improving algorithms for assigning quantization number and can efficiently assign a proper quantization number which minimizes quantization errors using the errors generated during quantization and coded bit length.

In general, according to the formatting method, a ¼" DVCR can be divided into a standard definition (SD)-DVCR, a high definition (HD)-DVCR, an advanced television (ATV)-DVCR which is a follow-on generation broadcasting, and a digital video disk (DVD)-DVCR, etc.

In SD-DVCR, the National Television System Committee (NTSC) or Phase Alternation by line (PAL) method, which is a currently used method, is digitally converted for compression using its own compression algorithm to then be recorded and reproduced in digital, and the specification is already determined, that is, tape formatting, encoding and decoding methods are prescribed.

In other words, the algorithm depending on the determined specification should be developed by manufacturers themselves. Particularly, for a DVCR implementation, it is very important to solve the problem of a quantization number $Q_{NO}$ which is the most influential factor in determining the efficiency of SD.

Hereinbelow, the generation of a general bit stream will be described with reference to accompanying drawings.

In the digital signal processing (DSP) in the SD method, an input NTSC or PAL signal is processed by an analog/digital (A/D) conversion to produce a Y.U.V composite digital signal sampled in a ratio of 4:2:2. Here, the luminance signal (Y) is sampled at 13.5 MHz and the chrominance signal (C) is sampled at 6.75 MHz. At this time, however, C is divided into Cr and Cb, each sampled at 3.375 MHz.

The thus-sampled video data quantity is too much to be recorded as it is. Thus, the data is decimated into a format of 4:1:1 to then be segmented into four 8×8 luminance DCT (discret cosine transform) blocks and two 8×8 chrominance DCT blocks, which consist of a macro-block unit.

For example, in case of the A/D conversion with 8-bit resolution, 8 bits/sample×(13.5 MHz+6.7 MHz)=162 Mbps.

The thus-converted digital video signal is compressed using DCT to then be recorded.

At this time, a DCT block is composed of 8 pixels horizontally and 8 lines vertically, as shown in FIG. 1.

As shown in FIGS. 2A and 2B which are schematic diagram of a luminance DCT block and a chrominance DCT block in a 525/60 system, in an NTSC (525 lines/60 Hz) system, the luminance DCT block is composed of 60 DCT blocks vertically and 90 DCT blocks horizontally, and the chrominance DCT block is composed of 60 DCT blocks vertically and 22.5 DCT blocks horizontally.

As shown in FIGS. 3A and 3B which are schematic diagram of a luminance DCT block and a chrominance DCT block in a 625/50 system, in a PAL (625 lines/50 Hz) system, the luminance DCT block is composed of 72 DCT blocks vertically and 90 DCT blocks horizontally, and the chrominance DCT block is composed of 36 DCT blocks vertically and 45 DCT blocks horizontally.

The digital video signal is subdivided into DCT blocks having the above-described configuration to produce a macro-block (MB) including four luminance DCT blocks and two chrominance DCT blocks, as shown in FIGS. 4A and 4B which are schematic diagram of a macro-block according to the NTSC or PAL method.

27 adjacent MBs are further combined to form a super block (SB), as shown in FIGS. 5A and 5B which are schematic diagrams of a 525/60 or 625/50 system. In a video having an SB, five MBs form a video segment, as shown in FIGS. 6A and 6B, to perform a bit rate reduction. At this time, each of five MBs constituting a video segment is shuffled based on the following regulation among various SBs:

$$VSi,k = \{MB(i+2)\bmod n, 2, k,\ MB(i+6)\bmod n, 1, k,\ MB(i+8)\bmod n, 3, k,\\ MBi\bmod n, 0, k,\ MB(i+4)\bmod n, 4, k\},$$

where i=0, . . . n−1, and k=0, . . . 26. If n is 10, the system is a 525/60 system, and if n is 12, the system is a 625/50 system.

In the VS constructed as described above, 77 bytes are assigned to each MB through a data compression process, and the overall VS should be reduced at a constant ratio of 385 bytes.

In the data compressed as described above, each compressed MB data fetched from different VS's is taken to the original position to be recorded, prior to another recording operation.

Hereinbelow, a bit rate reduction process for data compression will be described with reference to accompanying drawings.

FIG. 7 is a schematic block diagram illustrating the generation of a bit stream in a general DVCR.

First, as described above, the apparatus for generating a bit stream in a general DVCR includes a shuffler 71 for shuffling an input video in order to efficiently compress the same to then reconstruct the video, a motion estimator 72 for detecting a motion vector in order to efficiently perform the DCT with respect to the reconstructed video and a DCT portion 75 for performing a DCT operation depending on the motion vector of motion estimator 72. DCT portion 75 performs in two modes as shown in FIGS. 8A and 8B which are tables showing examples of DCT operations depending on the motion vector.

If the motion vector is small, a 8×8 DCT is performed.

<Forward DCT >

$$C_{i,j,k,l}(h, v) = C(v)C(h) \sum_{y=0}^{7} \sum_{x=0}^{7} P_{i,j,k,l}(x,y) \cos\left(\frac{\pi v(2y+1)}{16}\right)$$

$$\cos\left(\frac{\pi h(2x+1)}{16}\right)$$

<Inverse DCT >

$$P_{i,j,k,l}(x, y) = \sum_{v=0}^{7} \sum_{h=0}^{7} (C(v)C(h)C_{i,j,k,l}(h,v) \cos\left(\frac{\pi v(2y+1)}{16}\right)$$

$$\cos\left(\frac{\pi h(2x+1)}{16}\right)$$

-continued $$C(h) = \begin{cases} \frac{1}{2\sqrt{2}} & (h = 0) \\ \frac{1}{2} & (h \neq 0) \end{cases}$$

$$C(v) = \begin{cases} \frac{1}{2\sqrt{2}} & (v = 0) \\ \frac{1}{2} & (v \neq 0) \end{cases}$$

Here $P_{i,j,k,l}(x,y)$ represents a pixel and $C_{i,j,k,l}(h,v)$ represents a DCT coefficient.

<Forward DCT>

$$C_{i,j,k,l}(h, u) = C(u)C(h) \sum_{z=0}^{3} \sum_{x=0}^{7} ((P_{i,j,k,l}(x,2z) + P_{i,j,k,l}(x,2z+1))$$

$$\cos\left(\frac{\pi u(2z+1)}{8}\right) \cos\left(\frac{\pi h(2x+1)}{16}\right))$$

where $u = 0, \ldots, 3$).

<Inverse DCT>

$$P_{i,j,k,l}(x, 2z) = \sum_{u=0}^{3} \sum_{h=0}^{7} (C(u)C(h)C_{i,j,k,l}(h,u) + C_{i,j,k,l}(h,u+4))$$

$$\cos\left(\frac{\pi u(2z+1)}{8}\right) \cos\left(\frac{\pi h(2x+1)}{16}\right)$$

$$P_{i,j,k,l}(x, 2z+1) = \sum_{u=0}^{3} \sum_{h=0}^{7} (C(u)C(h)C_{i,j,k,l}(h,u) - C_{i,j,k,l}(h,u+4))$$

$$\cos\left(\frac{\pi u(2z+1)}{8}\right) \cos\left(\frac{\pi h(2x+1)}{16}\right)$$

Here, $z = int(y/2)$ where $z = 0, \ldots, 3$).

$$C(h) = \begin{cases} \frac{1}{2\sqrt{2}} & (h = 0) \\ \frac{1}{2} & (h \neq 0) \end{cases}$$

$$C(u) = \begin{cases} \frac{1}{2\sqrt{2}} & (v = 0) \\ \frac{1}{2} & (v \neq 0) \end{cases}$$

Here, $P_{i,j,k,l}(x,y)$ represents a pixel and $C_{i,j,k,l}(h,v)$ represents a DCT coefficient.

As described above, after preforming DCT operations in different modes depending on the motion vector, each DCT coefficient is added with a wieghted value. Each weighted-value-added coefficient within DCT block is scanned by a scanner 76.

At this time, the scanning is processed in the numerical sequence shown in FIGS. 8A and 8B depending on the DCT mode.

In addition, each DCT block selects one of four different classes in a class determiner 73 using the class information needed for selecting a quantizer during quantization. The class is selected depending on the activity of each DCT block.

Particularly, in case of class 3 having the largest activity, one bit of the least significant bit (LSB) of every area class (AC) coefficient within the DCT block is removed, which is called an initial scaling. This process is performed in a scale coefficient determiner 77.

At this time, the activity of each DCT block is obtained in a bit rate analyzer 74 by comparing all AC coefficients within the DCT block to search the coefficient having the maximum absolute magnitude (MAM), Each DCT block whose classes are analyzed as described above, is subdivided so as to have four different areas within the DCT block to have different quantization steps depending on the weighted value of the AC coefficient during quantization process, as shown in FIGS. 9A and 9B.

In other words, a low-frequency DCT coefficient is coded more precisely than a high-frequency DCT coefficient.

As described above, each DCT block constituting an MB has each class and each block is subdivided into four areas.

The number of areas represents the weight of a DCT coefficient.

At this time, quantizer is constructed to have 16 quantization steps, and the quantization steps are expressed, depending on the class and area, as shown in FIG. 10 which is a table illustrating quantization steps.

At this time, the multi-quantization converter 78 performs quantizations in four quantizations steps depending on the class and area using the quantization number $Q_{NO}$.

Each MB is quantized in a quantization converter 80 with one $Q_{NO}$ selected in quantization coefficient selector 79 to be variable-length coded in a variable-length coder (VLC) 81 and finally to then be sorted as shown in FIG. 11 which is a schematic diagram of the video quantized from the coded video information.

As described above, when an MB is sorted within 77 bytes, each MB performs a variable-length coding with different $Q_{NO}$s to have data having variable lengths.

Therefore, such MBs having variable length are first recorded in their own regions and then the data of the remaining MBs are recorded onto another MB areas which cannot filled in 77 bytes. Thus, each VS entirely satisfies 385 bytes.

The MBs within the thus-compressed VS restore into the original position taken before shuffling, prior to being recorded onto a tape again, that is a formatting is performed.

However, in the above-described quantization process, the respective MBs consisting of a VS are compressed with the $Q_{NO}$s suitable to their characteristics. In order to compress the VS in a fixed ratio, prior to quantization, if each DCT block predetermined and classified within the respective MBs consisting of a VS is quantization-VLC-performed, the compression should have been completed within 385 bytes in the unit of a VS, as described above. However, the respective shuffled MBs are independent from one another. Therefore, if the compression is collectively performed into 77 bytes, the picture quality may be deteriorated.

Therefore, in the conventional quantization process, in order to solve the above-mentioned problems, in order to perform compression by the allocation of bits adaptive to the complexity for the respective MBs, bits are allotted according to the ratio of the absolute magnitude sum (AMS) for the AC coefficients except the DC within the whole VS with respect to the AMS for the AC coefficients except the DC within the respective VSs.

$$L \frac{\sum_{j=0}^{5} \sum_{k=0}^{7} \sum_{l=0}^{7} |C_j(k,l)|}{\sum_{i=0}^{4} \sum_{j=0}^{5} \sum_{k=0}^{7} \sum_{l=0(k=0,l=0)}^{7} |C_{i,j}(k,l)|} \times WL$$

where i represents the number of MBs, j represents the number of DCT blocks, k and l the numbers of DCT coefficients, C represents the DCT coefficient, and WL represents the whole length.

As described above, since proper bits are allotted to each MB to be quantized prior to quantization, an MB which is more complex and having more information is coded more perfectly, which is called a pre-analyzing.

In the pre-analyzing for a proper bit allocation according to the aforementioned quantization method, in order to select the quantization number $Q_{NO}$ which can code adaptively to the number of bits, quantization should be performed for each MB in advance.

However, in the above-described method, the hardware constituting a quantizer becomes larger proportionally, and 16 kinds of quantizers and the corresponding VLC look-up tables are necessary.

Hereinbelow, a conventional quantization number selector will be described with reference to accompanying drawings.

As shown in FIG. 12, in the conventional quantization number selector, video segments are input to respective quantizers ($Q_0$ through $Q_{15}$) 20. Also, class number and area number are input to each quantizer 20.

In other words, the system is a multi-quantizer system that all possible quantizations depending on the quantization number $Q_{NO}$ exist.

The quantization step for each class number and area number depending on the quantization number $Q_{NO}$ is output by quantizers ($Q_0$ through $Q_{15}$) 20 and bit calculators (0 through 15) 21 so that the quantization number $Q_{NO}$ close to a desired compression ratio is selected in a bit estimator 22.

However, in the conventional multi-quantizer system, at least 1-bit shift not exceeding 4-bit shift is necessary according to the quantization steps.

A constant number of bits suitable for each macro-block of the input video segment should be allotted. Also, the quantization number $Q_{NO}$ suitable for the allotted should be selected for each macro-block. At this time, if the number of allotted bits is not suitable for the macro-block, a distortion may be caused to the macro-block.

SUMMARY OF THE INVENTION

Therefore, to solve the above problems of the conventional arts, it is an object of the present invention to provide an apparatus and method for selecting a quantization number of a DVCR which can simplify the hardware configuration of a quantizer by improving the algorithm for quantization number allocation and can efficiently assign the quantization number having optimum quantization error and a constant bit rate using the quantization error and coded bit length by using a serial quantizer not necessitating the quantization bank of full specification.

To accomplish the above object, there is provided a quantization number selecting apparatus of a DVCR according to the present invention comprising: a plurality of quantizers serially connected and having each quantization number, for receiving a video segment composed of a plurality of macro-blocks and sequentially performing quantization according to each area number and class number; a plurality of bit-rate calculators for calculating each bit rate by the respective outputs of the plurality of quantizers; a plurality of quantization error summing portions serially connected for calculating quantization errors by the outputs of the plurality of quantizers and sequentially summing the same; and a bit estimator for selecting a quantization number by which each macro-block can be compressed into an adaptive length by the respective outputs of the bit-rate calculators and quantization error summing portions.

Also, there is provided a method for selecting a quantization number of a DVCR according to the present invention comprising the steps of: (1) sequentially quantizing a plurality of macro-blocks constituting a video segment; (2) calculating and sequentially summing bit-rates and quantization errors depending on the plurality of quantized macro-block; and (3) searching a macro-block having the minimum quantization error based on the calculated and summed bit-rates and quantization errors and allotting a quantization number having an adaptive bit-rate.

Also, according to another embodiment of the present invention, there is provided a quantization number selecting apparatus comprising: a first quantizer for quantizing a video segment composed of an input plurality of macro-blocks into a first quantization number and calculating a variable-length (VL) coded value accessed from a VLC table; a first delay for delaying the input video segment for a constant time and outputting the delayed video segment; a first switch for switching access of a VLC value of the VLC table by the VLC value of the first quantizer; a second quantizer for quantizing the video segment output from the first delay into a second quantization number depending on the selection of the first switch; a third quantizer for quantizing the video segment output from the first delay into a third quantization number; a second switch for switching access of the VLC value of the VLC table by the VLC value of the second and third quantizers; a second delay for delaying the video segment output from the first delay for another constant time and outputting the delayed video segment; a fourth quantizer for quantizing the video segment output from the second delay into a fourth quantization number by the switching operation of the second switch; a fifth quantizer for quantizing the video segment output from the second delay into a fifth quantization number; a sixth quantizer for quantizing the video segment output from the second delay into a sixth quantization number; a seventh quantizer for quantizing the video segment output from the second delay into a seventh quantization number; and a quantization number selector for receiving the VLC values of the first through seventh quantizers and selecting a quantization number.

Also, according to another embodiment of the present invention, there is provided a method for selecting a quantization number of a DVCR according to the present invention comprising the steps of: (1) sequentially quantizing a video segment composed of a plurality macro-blocks into a first quantization number, calculating a first VLC value and comparing the same with a target length; (2) quantizing the video segment into a second quantization number if the first VLC value is greater than the target length, to calculate a second VLC value and compare the same with a target length, and quantizing the video segment composed of a plurality macro-blocks into a third quantization number for the other values to calculate a third VLC value and compare the same with a target length; (3) quantizing the video segment into a fourth quantization number if the third VLC value is greater than the target length, to calculate a fourth VLC value, and quantizing the video segment into a fifth quantization number for the other values to calculate a fifth VLC value, or quantizing the video segment into a sixth quantization number if the second VLC value is greater than the target length, to calculate a sixth VLC value, and quantizing the video segment into a seventh quantization number for the other values, to calculate a seventh VLC value; (4) determining a quantization number using the VLC values calculated according to the quantization steps in the first, second and third processes.

BRIEF DESCRIPTION OF THE DRAWINGS

The above objects and advantages of the present invention will become more apparent by describing in detail a preferred embodiment thereof with reference to the attached drawings in which:

FIG. 1 is a schematic diagram of a DCT block;

FIGS. 5A and 5B are schematic diagrams of a super-block in the 525/60 or 625/50 system;

FIGS. 6A and 6B are schematic diagrams of a frame in the 525/60 or 625/50 system;

FIGS. 8A and 8B are construction tables showing examples of DCT transform;

FIGS. 9A and 9B are construction tables showing examples of DCT transform according to area numbers;

FIG. 19 is a formatting schematic diagram according to the second embodiment of the present invention.

DETAILED DESCRIPTION OF THE INVENTION

According to the first embodiment of the present invention, the quantization number selecting and method of a DVCR selects a quantization number using a quantization error and coded bit length.

Figure 2A:
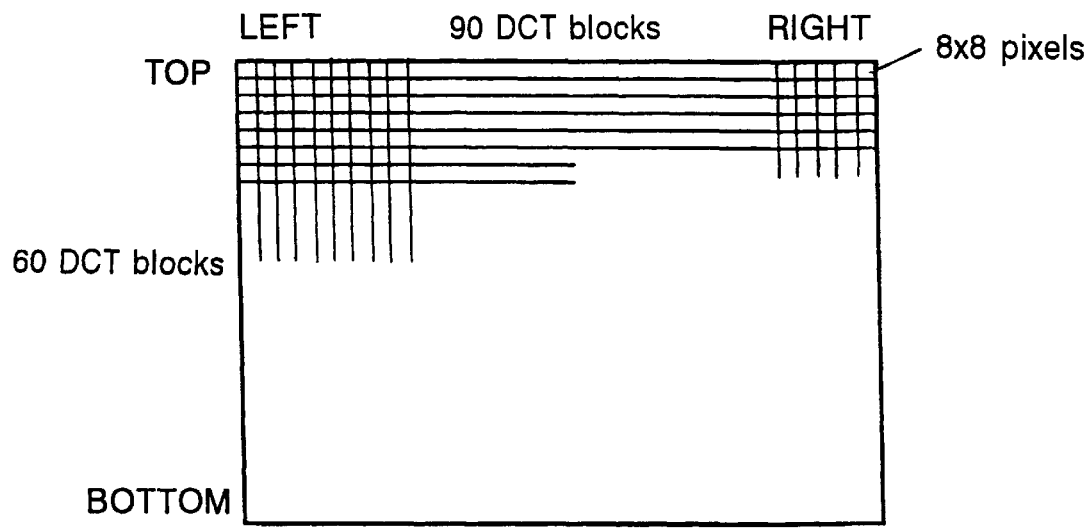
FIGS. 2A and 2B are schematic diagrams of a luminance DCT block and a chrominance DCT block in a 525/60 system, respectively.
Figure 2B:
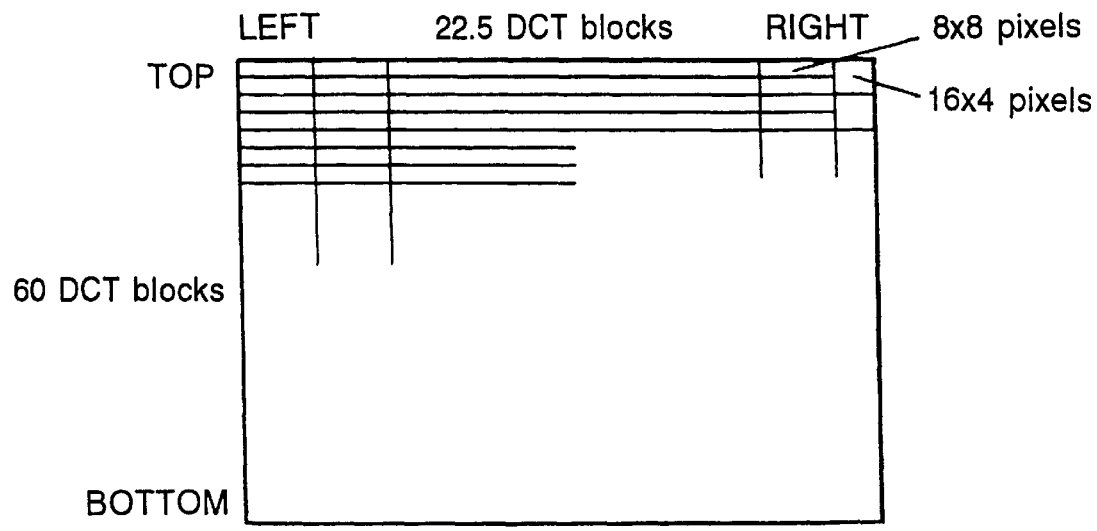
Figure 3A:
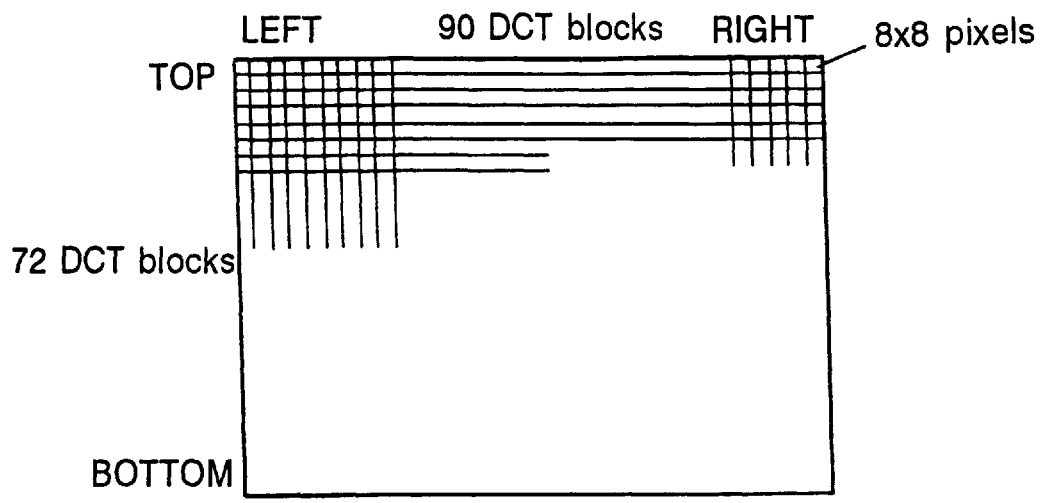
FIGS. 3A and 3B are schematic diagrams of a luminance DCT block and a chrominance DCT block in a 625/50 system, respectively.
Figure 3B:
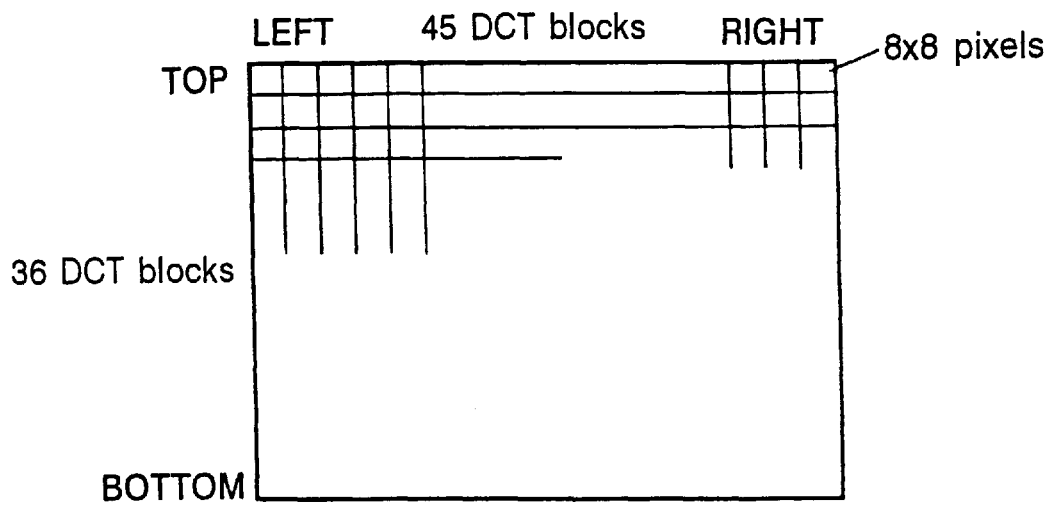
Figure 4A:
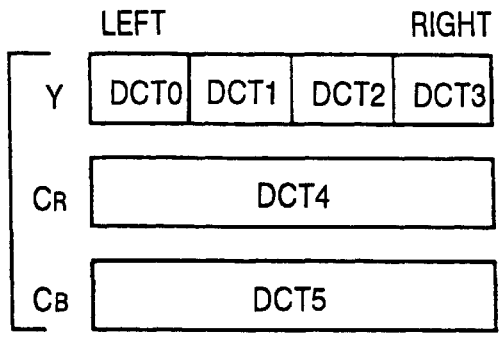
FIGS. 4A and 4B are schematic diagrams of a macro-block according to an NTSC or PAL method.
Figure 4B:
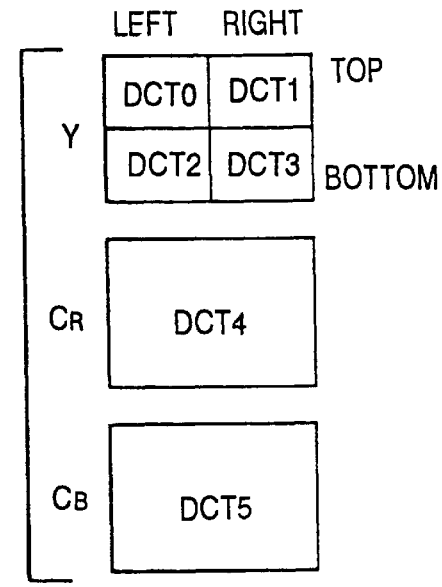
Figure 7:
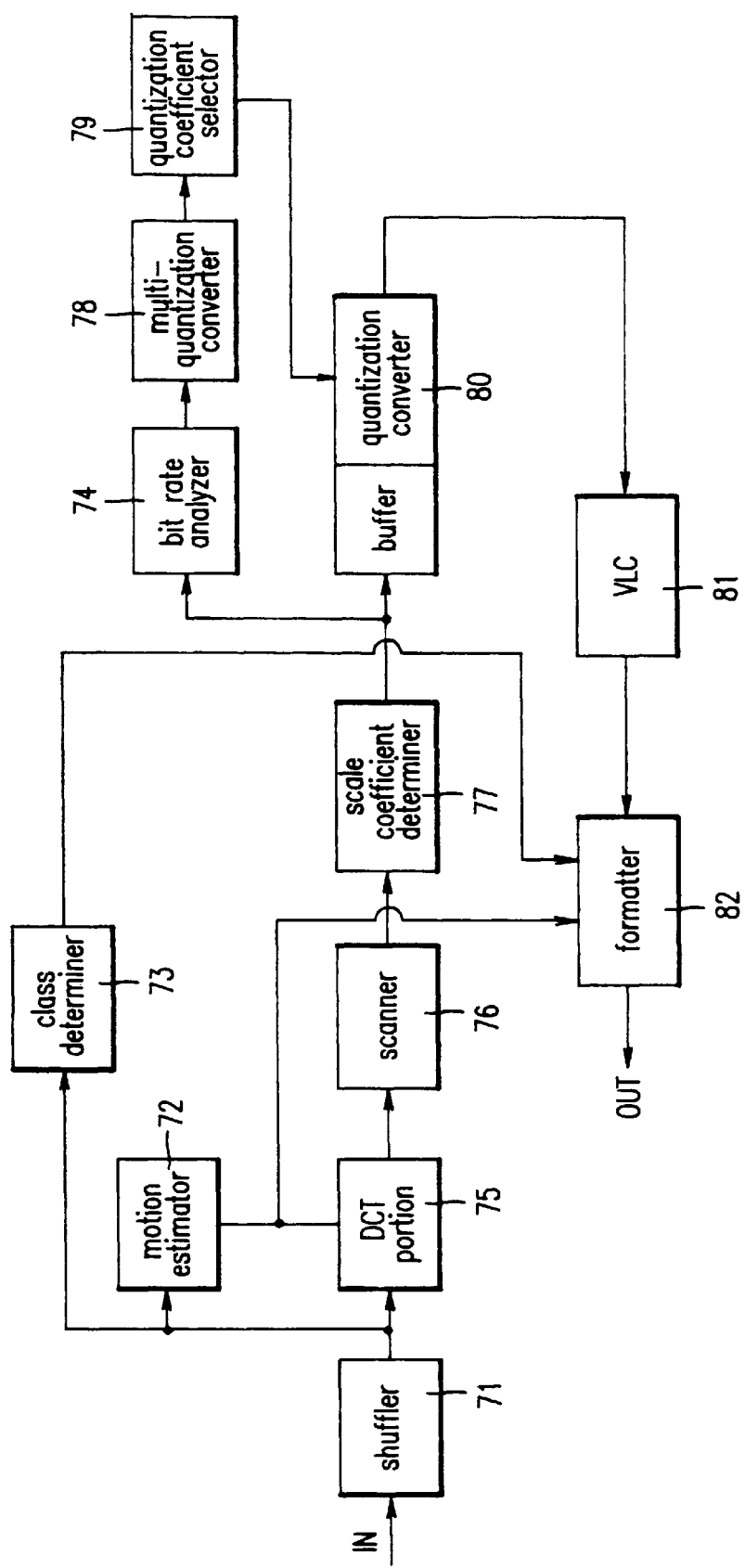
FIG. 7 is a schematic block diagram illustrating a process of generating a bit stream in a general DVCR.
Figures 10, 11:
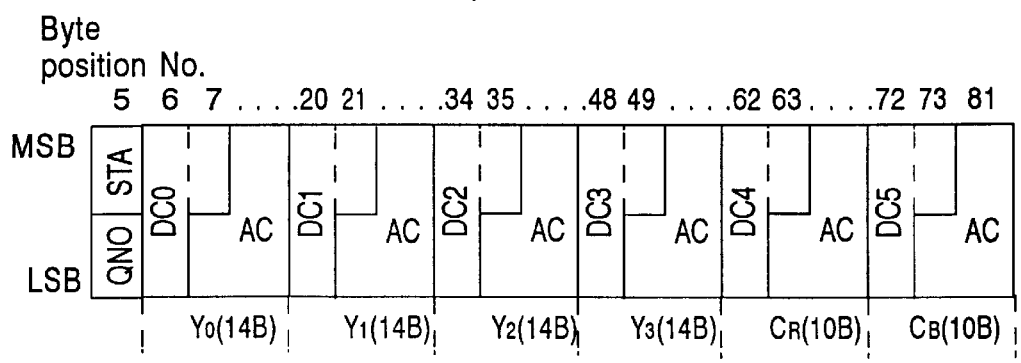
FIG. 10 is a construction table showing quantization steps.
FIG. 11 is a schematic diagram of a quantized video.
Figure 12:
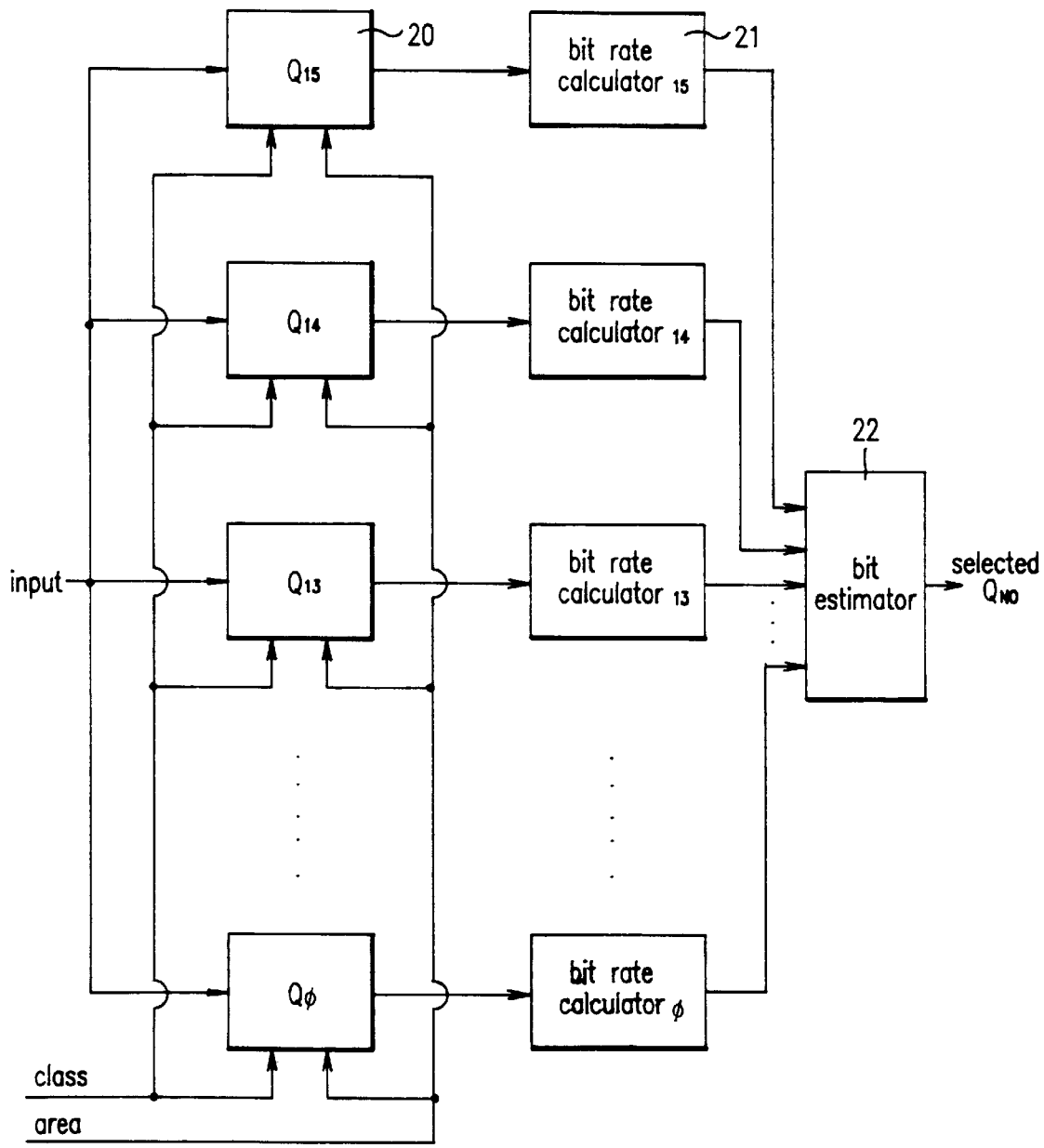
FIG. 12 is a schematic block diagram of a conventional quantization number selector.

As shown in FIG. 10, the quantization steps are generally in the form of 1.2.4.8.16, which can be expressed in $2^n$ (n=0, 1, 2, . . .). Therefore, quantization is performed by shifting the least significant bit (LSB).

At this time, if the LSB of shift circuit is "1," a quantization error is inserted. If the LSB of shift circuit is "0," a quantization error is not inserted, which is a special case.

In other words, if the quantization step is 1.2.4.8 in case of 8 (that is, 1000), a quantization error is not generated at all.

Therefore, as described above, the LSB for each macro-block is checked to search a quantization number to minimize the quantization errors, so that a quantization number for each macro-block, which can compress a video segment to a constant unit or below, can be selected.

The quantization step is determined according to the quantization number by input class number and area number if there are quantization numbers $Q_{NO15}$~$Q_{NO0}$. The class number indicates the activity of a DCT block and the area number indicates the weight of a DCT coefficient.

Figure 13:
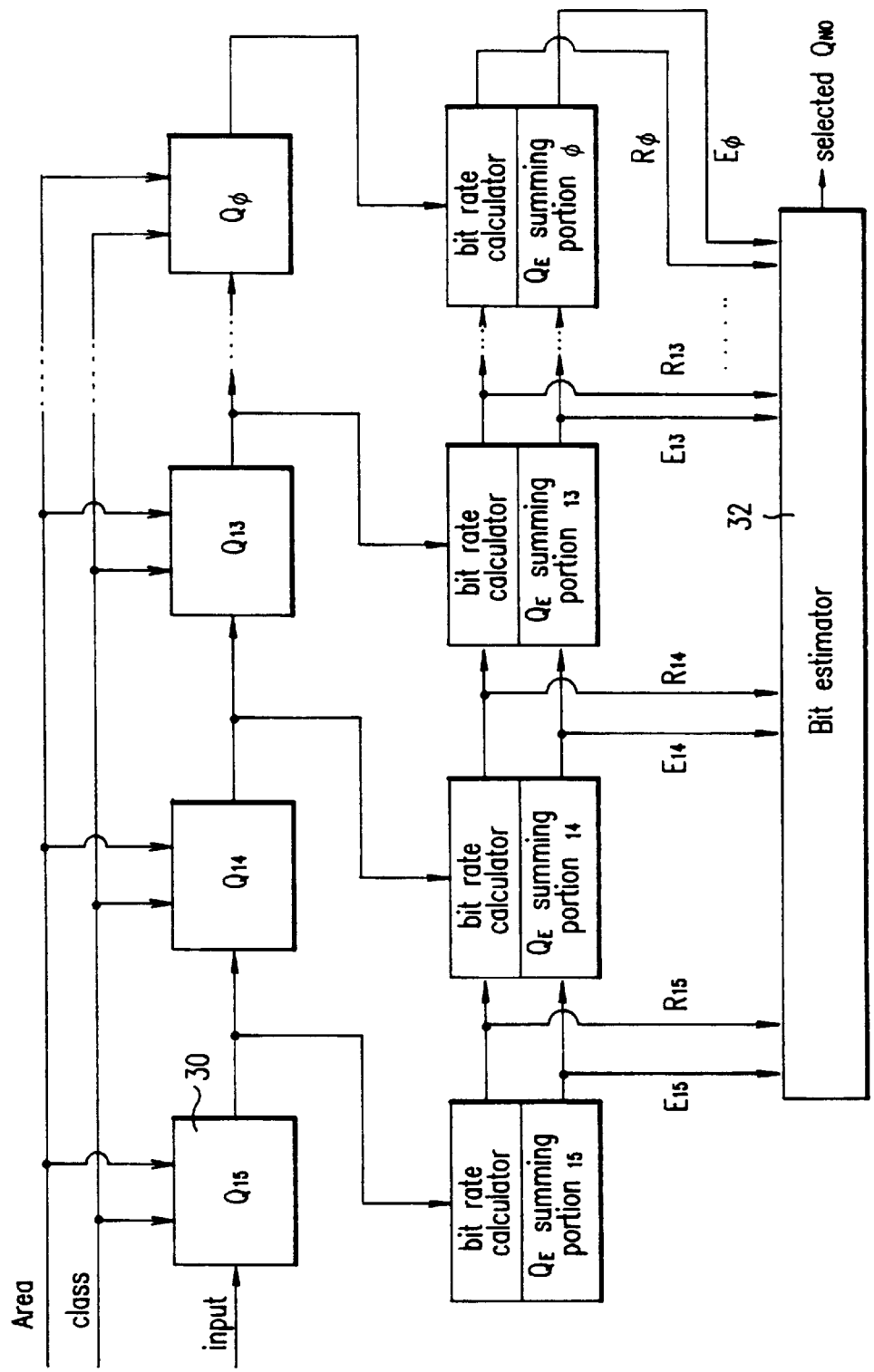
FIG. 13 is a schematic block diagram of a quantization number selector according to a first embodiment of the present invention.

As shown in FIG. 13, according to a first embodiment of the present invention, if quantizers 30 having each quantization number $Q_{NO15}$~$Q_{NO0}$ are serially connected for serial processing, only 1-bit shifts exist all the time, thereby simplifying the hardware of quantizers 30.

For example, if the quantization number QNO is changed from 8 to 7, the step is changed from 1 to 2 only when the class number is 0 and the area number is 2. When the class number is 2, since the quantization step is changed from 2 to 4 and from 4 to 8, for the area numbers 1 and 3, 1-bit shift only completes the quantization.

If the rate of five compressed macro-blocks, i.e., the bit-rate of a video segment, is longer than an original target rate, it should be determined which macro-block is more compressed than other four macro-blocks, that is, whose quantization number $Q_{NO}$ is reduced. The quantization number $Q_{NO}$ of the macro-block MB having the minimum quantization error $Q_E$ is reduced using the quantization errors calculated by bit-rate calculator/quantization error summing portions 31, thereby controlling the bit-rate.

Hereinbelow, the operation of the quantization number selector according to the first embodiment of the present invention for obtaining the optimum quantization number will be described.

Figure 14:
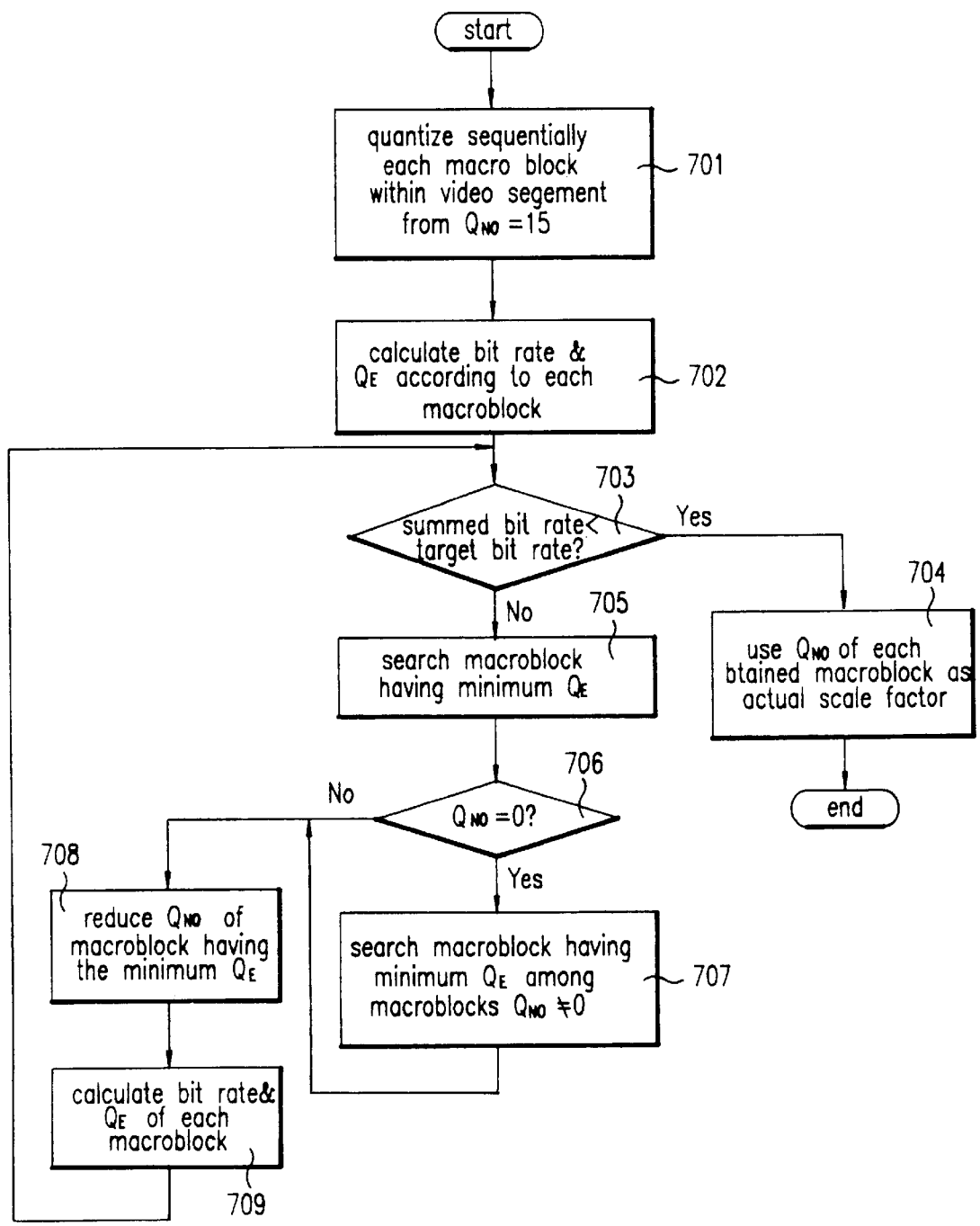
FIG. 14 is a flowchart showing a quantization number selecting method according to the first embodiment of the present invention.

As shown in FIG. 14, vide segment signals are input and five macro-blocks are quantized into quantization number ($Q_{NO}$) 15, respectively (step 701). The bit-rate of each macro-block (MB) generated thereat and quantization error are calculated and summed (step 702).

The summed bit rate and a target bit rate are compared (step 703).

If it is determined in step 703 that the bit rate of the video segment is higher than the intended target bit rate, in order to select whose quantization number $Q_{NO}$ should be reduced among five MBs, the MB having the minimum quantization error $Q_E$ is searched, based on the quantization errors obtained in bit-rate calculator/quantization error summing portions 31 (step 705).

It is determined whether the quantization number $Q_{NO}$ of the MB having the minimum quantization error $Q_E$ is 0 or not (step 706). If the quantization number $Q_{NO}$ is 0, the MB having the minimum quantization error $Q_E$ is searched among the MBs whose quantization number $Q_{NO}$ is not 0 (step 707).

The quantization number $Q_{NO}$ of the MB having the minimum quantization error $Q_E$ is reduced (step 708). The bit-rate and quantization error $Q_E$ of each macro-block (MB) are calculated and summed (step 709). The summed bit rate and a target bit rate are compared again (step 703). If the summed bit rate is proper, the obtained quantization number $Q_{NO}$ of each MB is used as the actual scale factor (step 704).

In other words, since the quantization number $Q_{NO}$ of the MB having the minimum quantization error $Q_E$ is reduced, the bit-rate is the video segment finally coincides with the target rate, thereby efficiently designating the proper quantization number $Q_{NO}$ having the minimum quantization error $Q_E$.

Figure 15:
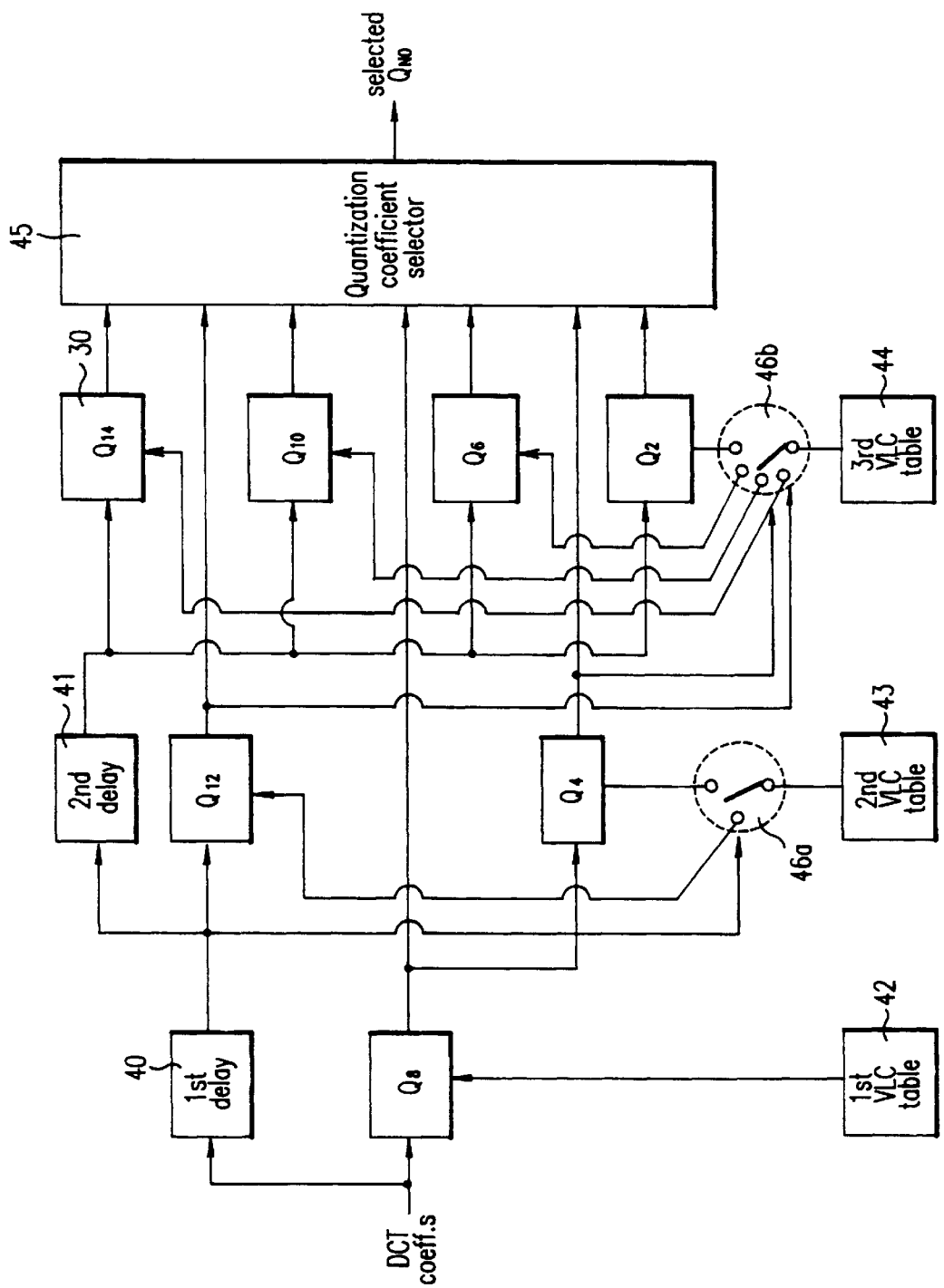
FIG. 15 is a schematic block diagram of a quantization number selector according to a second embodiment of the present invention.
Figure 16:
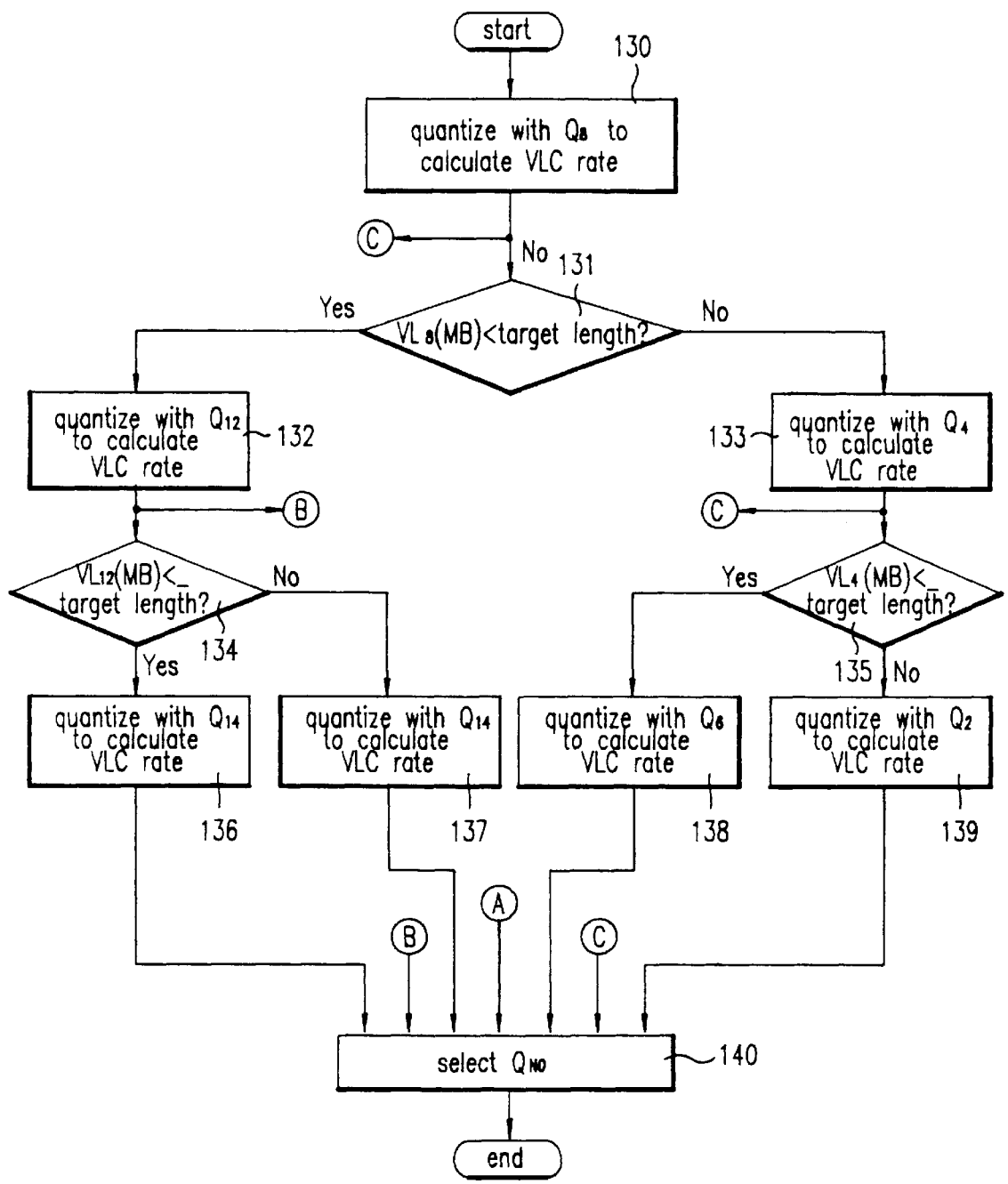
FIG. 16 is a first flowchart showing a quantization number selecting method according to the second embodiment of the present invention.

FIG. 15 is a schematic block diagram of a quantization number selecting apparatus according to a second embodiment of the present invention, and FIG. 16 is a first flowchart showing a quantization number selecting method according to the second embodiment of the present invention.

First, as shown in FIG. 15, the quantization number selector according to a second embodiment of the present invention includes a first quantizer $Q_8$ for quantizing a video segment composed of an input plurality of macro-blocks into a quantization number 8 ($Q_{NO}8$) and calculating a variable-length coded (VLC) value accessed from a variable length coding (VLC) table, a first delay 120 for delaying the input video segment for a constant time and outputting the delayed video segment, a first switch 126a for switching access of a VLC value of VLC table by the VLC value of first quantizer $Q_8$, a second quantizer $Q_{12}$, for quantizing the video segment output from first delay 120 into a quantization number $Q_{NO}12$ depending on the selection of first switch 126a, a third quantizer $Q_4$ for quantizing the video segment output from first delay 120 into a quantization number 4 ($Q_{NO}4$), a second switch 126b for switching access of the VLC value of VLC table by the VLC values VL12 (MB) and VL4 (MB) of second and third quantizers $Q_{12}$ and $Q_4$, a second delay 121 for delaying the video segment output from first delay 120 for another constant time and outputting the delayed video segment, a fourth quantizer $Q_{14}$ for quantizing the video segment output from second delay 121 into a quantization number 14 $Q_{NO}14$ by the switching operation of second switch 126b, a fifth quantizer $Q_{10}$ for quantizing the video segment output from second delay 121 into a quantization number 10 ($Q_{NO}10$), a sixth quantizer $Q_6$ for quantizing the video segment output from second delay 121 into a quantization number 6 ($Q_{NO}6$), a seventh quantizer $Q_2$ for quantizing the video segment output from second delay 121 into a quantization number 2 ($Q_{NO}2$), and a quantization number selector 125 for receiving the VLC values of first through seventh quantizers $Q_8$, $Q_{12}$, $Q_4$, $Q_{14}$, $Q_{10}$, $Q_6$ and $Q_2$ and selecting a quantization number $Q_{NO}$.

Also, as shown in FIG. 16, the quantization number selecting method according to the second embodiment of the present invention includes the steps of (1) quantizing a video segment composed of a plurality macro-blocks into a quantization number 8 ($Q_{NO}8$) to calculate a VLC value VL8 (MB) (step 130) and comparing the same with a target length (step 131), (2) quantizing the video segment into a quantization number 4 ($Q_{NO}4$) if the VLC value VL8 (MB) is greater than the target length, to calculate a VLC value VL4 (MB) (step 133) and compare the same with a target length (step 135), and quantizing the video segment composed of a plurality macro-blocks into a quantization number 12 ($Q_{NO}12$) for the other values, to calculate a VLC value VL12 (MB) (step 132) and compare the same with a target length (step 134), (3) quantizing the video segment into a quantization number 10 ($Q_{NO}10$) if the VLC value VL12 (MB) is greater than the target length, to calculate a VLC value VL10 (MB) (step 137), and quantizing the video segment into a quantization number 14 ($Q_{NO}14$) for the other values, to calculate a VLC value VL14 (MB) (step 136), or quantizing the video segment into a quantization number 2 ($Q_{NO}2$) if the VLC value VL4 (MB) is greater than the target length, to calculate a VLC value VL2 (MB) (step 139), and quantizing the video segment into a quantization number 6 ($Q_{NO}6$) for the other values, to calculate a VLC value VL6 (MB) (step 138), (4) determining a quantization number using the VLC values ($Q_{NO}2$, $Q_{NO}4$, ... $Q_{NO}12$, $Q_{NO}14$) calculated according to the quantization steps in the first, second and third processes (step 140).

In other words, the bit number of the MB is simply calculated by the quantization using first quantizer $Q_8$ having quantization number 8 ($Q_{NO}8$) which is the mid number of $Q_{NO}15$ and $Q_{NO}0$ and VLC table (look-up table) including VLC lengths.

If the bit number of the MB, calculated by first quantizer Q8, is smaller than or equal to the target length (VL8 (MB)≦target length), the MB has a more suitable quantization number $Q_{NO}$.

Therefore, in the following step, the quantization number $Q_{NO}$ exists between 15 and 8, the quantization is performed and the VLC length is calculated into a quantization number 12 being therebetween.

If the value obtained in the above process satisfies the relationship VL12 (MB)≦target length, the desired quantization number $Q_{NO}$ exists between quantization numbers 15 and 12. However, if the relationship is not satisfied, the desired quantization number $Q_{NO}$ exists between quantization numbers 12 and 8.

Therefore, in the final step, the quantization is performed and the VLC length is calculated with a more satisfiable quantization number $Q_{NO}$ of $Q_{14}$ and $Q_{10}$ being between the above two ranges of the quantization number, to then the result to quantization number selector 125.

Quantization number selector 125 selects the quantization number $Q_{NO}$ by the algorithm to be described below.

Figure 17:
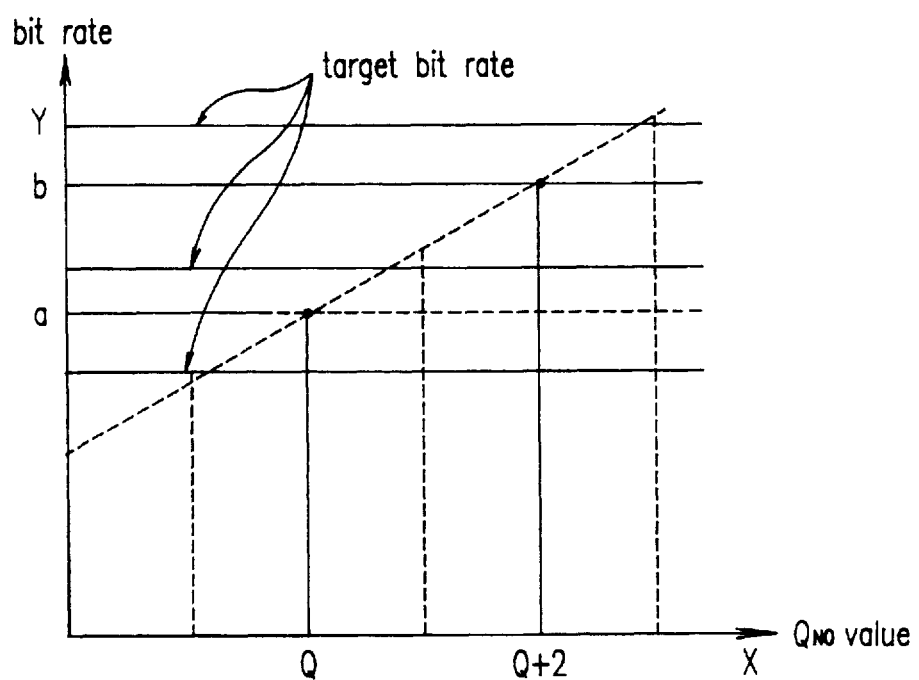
FIG. 17 is a graph showing the bit-rate variation depending on the change of the quantization numbers according to the second embodiment of the present invention.
Figure 18:
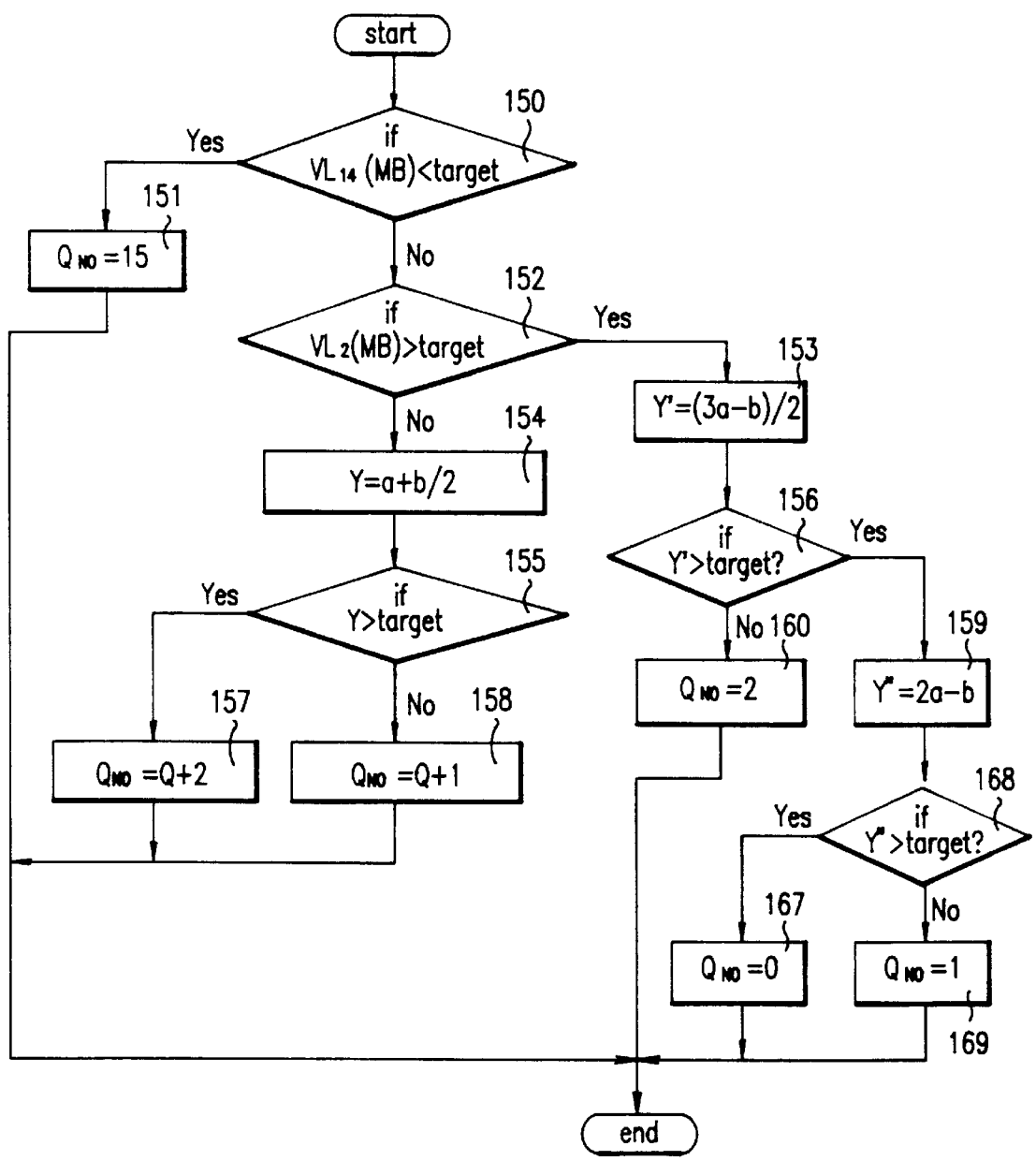
FIG. 18 is a second flowchart showing a quantization number selecting method according to the second embodiment of the present invention.

FIG. 17 is a graph showing the bit-rate variation depending on the change of the quantization numbers according to the second embodiment of the present invention, and FIG. 18 is a second flowchart showing a quantization number selecting method according to the second embodiment of the present invention.

As shown in FIG. 18, the quantization number selecting method according to the second embodiment of the present invention includes the steps of (1) comparing VL14 (MB) with a target bit-rate in order to estimate and calculate a mid or boundary value of the quantization number $Q_{NO}$ (step 150), determining the quantization number $Q_{NO}$ as 15 if VL14 (MB) is smaller than the target bit-rate (step 151), comparing VL2 (MB) with the target bit-rate if VL14 (MB) is larger than the target bit-rate (step 152), (2) adding the bit-rate of a first quantization number $Q_{NO}$ (a) and the bit-rate of a second quantization number $Q_{NO}$ (b) and if the target bit-rate is larger than VL2 (MB), dividing the added bit-rate by two, that is, {(a+b)/2=Y} (step 154), comparing the result (Y) with the target bit-rate (step 155), determining the quantization number $Q_{NO}$ as Q+2 (step 157) if the target bit-rate is smaller than Y, determining the quantization number $Q_{NO}$ as Q+1 (step 158) if the target bit-rate is larger than Y, and (3) multiplying the bit-rate of the first quantization number $Q_{NO}$ (a) by three, subtracting the bit-rate of the second quantization number $Q_{NO}$ (b) and then dividing by two, that is, {(3a−b)/2=Y'}, if VL14 (MB) is smaller than the target bit-rate, (step 153), comparing the result (Y') with the target bit-rate (step 156), determining the quantization number $Q_{NO}$ as 2 if the target bit-rate is larger than Y',(step 160), multiplying the bit-rate of the first quantization number $Q_{NO}$ (a) by two and subtracting the bit-rate of the second quantization number $Q_{NO}$ (b), that is, {(2a−b)/2=Y"} (step 159), comparing the result (Y") with the target bit-rate (step 168), determining the quantization number $Q_{NO}$ as 0 if the target bit-rate is larger than Y", (step 167), and determining the quantization number $Q_{NO}$ as 1 if the target bit-rate is smaller than Y", (step 169). Here, the first quantization number $Q_{NO}$ (a) is the bit-rate when QNO equals to Q, and the second quantization number $Q_{NO}$ (b) is the bit-rate when QNO equals to Q+2, where Q=2, 4, ... , 12, 14.

As described above, if the quantization number $Q_{NO}$ is determined by quantization number selector 125, the quantization and VLC operation are performed with the quantization number $Q_{NO}$ to generate a bit stream to then be transmitted to a formatter (not shown).

At this time, since the bit stream transmitted to the formatter is obtained in quantization number selector 125, the bit stream is not always smaller than the target rate.

In other words, in case of VLQ+1 (MB), since the bit stream is estimated by VLQ and VLQ+2, the formatter formats the coded data stream into a unit (U), as shown in FIG. 19. At this time, $U_{(i+2)mod\ n,2,k}$ partially includes all kinds of data of $MB_{(i+2)mod\ n,2,k}$. Also, the compressed data of $MB_{(i+6)mod\ n,1,k}$, $MB_{(i+8)mod\ n,3,k}$, $MB_{imod\ n,0,k}$, and $MB_{(i+4)mod\ n,4,k}$ may be included.

Also, since $U_{(i+6)mod\ n,1,k}$, $U_{(i+8)mod\ n,3,k}$, $U_{imod\ n,0,k}$, and $U_{(i+4)mod\ n,4,k}$ have the same characteristics as above, five MBs are compressed with a fixed rate in the unit of a video segment (VS) to then be recorded.

Finally, the shuffled MBs for each VS are restored into their original position to then be recorded.

As described above, the quantization number selecting apparatus and method for a DVCR according to the present invention can simplify the hardware configuration of a quantizer by skipping calculation of a set of quantization numbers unnecessary for the next state with several delays, in determining the quantization number. The adaptive quantization number having the minimum quantization error can be efficiently designated using the errors generated during quantization process and coded bit length.

What is claimed is:

1. A quantization number selecting apparatus of a DVCR comprising:
   a plurality of quantizers serially connected and having each quantization number, for receiving a video segment composed of a plurality of macro-blocks and sequentially performing quantization according to each area number and class number;
   a plurality of bit-rate calculators for calculating each bit rate by the respective outputs of said plurality of quantizers;
   a plurality of quantization error summing portions serially connected for calculating quantization errors by the outputs of said plurality of quantizers and sequentially summing the same; and
   a bit estimator for selecting a quantization number by which each macro-block can be compressed into an adaptive length by the respective outputs of said bit-rate calculators and quantization error summing portions.

2. A method for selecting a quantization number of a DVCR comprising the steps of:
   (1) sequentially quantizing a plurality of macro-blocks constituting a video segment;
   (2) calculating and sequentially summing bit-rates and quantization errors depending on said plurality of quantized macro-block; and
   (3) searching a macro block having the minimum quantization error based on said calculated and summed bit-rates and quantization errors and allotting a quantization number having an adaptive bit-rate;
   wherein said step (3) includes (a) comparing said summed bit-rate with a target bit rate, and searching a macro-block having the minimum quantization error if said summed bit-rate is smaller than said target bit-rate, (b) reducing the quantization number of the macro-block having the minimum quantization error until said quantization number becomes zero, and calculating the bit-rate and quantization error of each macro-block, (c) searching a macro-block having the minimum quantization error among the macro-blocks whose quantization number is not zero if said quantization number becomes zero, and (d) repeating said steps (a) through (c) and using the obtained quantization number of each macro-block as the actual scale factor.

3. A quantization number selecting apparatus comprising:
   a first quantizer for quantizing a video segment composed of an input plurality of macro-blocks into a first quantization number and calculating a variable-length (VL) coded value accessed from a VLC table;
   a first delay for delaying said input video segment for a constant time and outputting said delayed video segment;
   a first switch for switching access of a VLC value of said VLC table by said VLC value of said first quantizer;
   a second quantizer for quantizing the video segment output from said first delay into a second quantization number depending on the selection of said first switch;
   a third quantizer for quantizing the video segment output from said first delay into a third quantization number;
   a second switch for switching access of the VLC value of said VLC table by said VLC values of said second and third quantizers;
   a second delay for delaying the video segment output from said first delay for another constant time and outputting said delayed video segment;
   a fourth quantizer for quantizing the video segment output from said second delay into a fourth quantization number by the switching operation of said second switch;
   a fifth quantizer for quantizing the video segment output from said second delay into a fifth quantization number;
   a sixth quantizer for quantizing the video segment output from said second delay into a sixth quantization number;
   a seventh quantizer for quantizing the video segment output from said second delay into a seventh quantization number; and
   a quantization number selector for receiving the VLC values of said first through seventh quantizers and selecting a quantization number.

4. A method for selecting a quantization number of a DVCR comprising the steps of:
   (1) sequentially quantizing a video segment composed of a plurality macro-blocks into a first quantization number, calculating a first VLC value and comparing the same with a target length;
   (2) quantizing said video segment into a second quantization number if said first VLC value is greater than said target length, to calculate a second VLC value and compare the same with said target length,
   and quantizing said video segment into a third quantization number for the other values to calculate a third VLC value and compare the same with said target length;
   (3) quantizing the video segment into a fourth quantization number if said third VLC value is greater than said target length, to calculate a fourth VLC value, and quantizing said video segment into a fifth quantization number for the other values to calculate a fifth VLC value, and quantizing said video segment into a sixth quantization number if said second VLC value is greater than said target length, to calculate a sixth VLC value, and quantizing said video segment into a seventh quantization number for the other values, to calculate a seventh VLC value;

(4) determining a quantization number using said VLC values calculated according to the quantization steps obtained in said first, second and third processes.

5. A method for selecting a quantization number of a DVCR as claimed in claim 4, wherein said step (4) includes the steps of (a) comparing VL14 (MB) with a target bit-rate in order to estimate and calculate a mid or boundary value of the quantization number, determining the quantization number as 15 if VL14 (MB) is smaller than the target bit-rate, comparing VL2 (MB) with the target bit-rate if VL14 (MB) is larger than the target bit-rate, (b) adding the bit-rate of a first quantization number (a) and the bit-rate of a second quantization number (b) and if said target bit-rate is larger than VL2 (MB), dividing the added bit-rate by two, that is, (a+b)/2, comparing the result with said target bit-rate, determining the quantization number as Q+2 if said target bit-rate is smaller than the result, determining the quantization number as Q+1 if said target bit-rate is larger than the result, and (c) multiplying the bit-rate of said first quantization number (a) by three, subtracting the bit-rate of said second quantization number (b) and then dividing by two, that is, (3a−b)/2, if VL14 (MB) is smaller than said target bit-rate,, comparing the result with said target bit-rate, determining the quantization number as 2 if said target bit-rate is larger than the result, multiplying the bit-rate of said first quantization number (a) by two and subtracting the bit-rate of said second quantization number (b), that is, (2a−b)/2, comparing the result with said target bit-rate, determining the quantization number as 0 if said target bit-rate is larger than the result, and determining the quantization number as 1 if said target bit-rate is smaller than the result.

6. A method for selecting a quantization number of a DVCR as claimed in claim 4, wherein in said step (b), said first quantization number (a) is the bit-rate when said quantization number equals to Q, and said second quantization number (b) is the bit-rate when said quantization number equals to Q+2, where Q=2, 4, . . . , 12, 14.

* * * * *